United States Patent
Nilsson et al.

(10) Patent No.: US 7,120,695 B2
(45) Date of Patent: Oct. 10, 2006

(54) METHOD FOR LIMITING CONVEYANCE INFORMATION OF USER PROFILE WITHIN MOBILE INTERNET TRANSACTIONS

(75) Inventors: Mikael Nilsson, Karlstad (SE); Helena Lindskog, Karlstad (SE); Simone Fischer-Hübner, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 709 days.

(21) Appl. No.: 09/938,085

(22) Filed: Aug. 23, 2001

(65) Prior Publication Data

US 2003/0041100 A1 Feb. 27, 2003

(51) Int. Cl.
G06F 15/16 (2006.01)
G06F 15/173 (2006.01)

(52) U.S. Cl. .................... 709/228; 709/203; 709/232

(58) Field of Classification Search ................ 709/203, 709/200, 223, 227, 228, 232; 713/156; 707/9
See application file for complete search history.

(56) References Cited

U.S. PATENT DOCUMENTS

| | | | |
|---|---|---|---|
| 6,189,101 B1 * | 2/2001 | Dusenbury, Jr. ................ 726/2 |
| 6,253,203 B1 * | 6/2001 | O'Flaherty et al. ............. 707/9 |
| 6,308,203 B1 * | 10/2001 | Itabashi et al. ............. 709/217 |
| 6,317,718 B1 * | 11/2001 | Fano .............................. 705/1 |
| 6,330,610 B1 * | 12/2001 | Docter et al. ................ 709/229 |
| 6,480,850 B1 * | 11/2002 | Veldhuisen ..................... 707/9 |
| 6,581,059 B1 * | 6/2003 | Barrett et al. .................. 707/9 |
| 6,678,516 B1 * | 1/2004 | Nordman et al. ......... 455/414.1 |
| 6,711,682 B1 * | 3/2004 | Capps ......................... 713/184 |
| 6,735,186 B1 * | 5/2004 | Leppinen ..................... 370/338 |
| 6,959,420 B1 * | 10/2005 | Mitchell et al. ............. 709/224 |
| 2002/0147766 A1 * | 10/2002 | Vanska et al. ............... 709/203 |
| 2002/0174073 A1 * | 11/2002 | Nordman et al. .............. 705/64 |
| 2003/0233461 A1 * | 12/2003 | Mariblanca-Nieves et al. .. 709/228 |
| 2005/0096016 A1 * | 5/2005 | Tervo et al. .............. 455/414.1 |

FOREIGN PATENT DOCUMENTS

| EP | 1 081 916 A | 3/2002 |
| EP | 107511 | 4/2002 |
| WO | WO 00/52900 A | 9/2000 |
| WO | WO 01/50299 A | 7/2001 |

OTHER PUBLICATIONS

Meyer, Jorg; "How to manage, negotiate, and transfer personal information on the Web." Mar. 11, 1999; http://www.w3.com/p3p.*
Berthold, Oliver; "Identity Management Based On P3P" Jul. 2000; http://www.w3.com/p3p.*

* cited by examiner

Primary Examiner—Saleh Najjar
Assistant Examiner—Kevin T Bates

(57) ABSTRACT

A system and method for contacting the origin server from a user comprises the steps of generating a minimal user profile for the user that is stored at a node associated with the user, said minimal user profile containing user designated CPI. A connection is established from the node to an origin server using the minimal user profile, and a determination is made if the privacy profile of the origin server meets the privacy preferences of the user. If so, a second user profile containing a more detailed CPI is provided to the origin server.

18 Claims, 2 Drawing Sheets

METHOD FOR LIMITING CONVEYANCE INFORMATION OF USER PROFILE WITHIN MOBILE INTERNET TRANSACTIONS

TECHNICAL FIELD

The present invention relates to the transmission of user profiles in the mobile Internet, and more particularly, to the use of a minimal user profile within mobile Internet transactions.

BACKGROUND OF THE INVENTION

Recent advances in wireless telecommunications have enabled the mobile Internet to grow by leaps and bounds. The mobile Internet provides users access to Internet services and other service based applications using mobile devices such as mobile telephones, portable computers, pagers, personal digital assistants, etc., and makes new services such as location based and context aware applications available to users of the mobile Internet. Presently, wireless application protocol (WAP), iMode, and standard HTML over modified TCP/IP (used in most Personal Digital Assistants) are the most frequently used protocols on the mobile Internet.

Along with the greater uses provided by mobile web services have also arisen greater privacy risks due to the ability of third parties to track the position, capability, preferences information, and other data pertaining to users of the mobile Internet. This raises the issue of appropriate data protection and privacy safeguards for Mobile Internet users who desire to be protected from being under permanent surveillance due to their use of wireless technology without resorting to protecting their privacy by not using mobile Internet services at all.

Existing recommendations with respect to the Platform for Privacy Preferences Project (P3P) specifies a protocol that provides an automated way for users to gain control over the use of personal data on web sites they visit. The proposal enables web sites to express their privacy practices in a machine readable XML format that can be automatically retrieved and compared with a user's privacy preferences. Using this information, a user can make informed decisions on whether or not to submit a certain piece of personal information to a web site.

In order to protect a user's right for informational self-determination, users should have control over their CPI (Capabilities and Preferences Information), represented by means of a profile, and determine how far and to what extent to communicate profile information to other web sites. The proposed protocol can enhance the user's privacy by transmitting the CPI only if there is an informed consent by the user about the origin server's site data collection and use practices.

However, the existing exchange protocol CC/PP (Composite Capability/Preferences Profile) uses a modified WSP or HTTP GET request already containing the profile information or profile difference. The proposed P3P standard requires a first check as to whether there is sufficient match between the user's privacy preferences and the remote server's privacy policy before any personal data is transmitted. Thus, some manner for overcoming this conflict is necessary.

SUMMARY OF THE INVENTION

The present invention overcomes the foregoing and other problems with a system and method for contacting an origin server from a node associated with a user. A minimal user profile containing only user designated CPI is generated by the user and stored within a node associated with the user. The minimal user profile is used to establish a connection with an origin server such that a determination may be made if the privacy policy of the origin server meets the privacy policy of the user. If the privacy policy of the origin server meets the privacy preferences of the user, the origin server may then be provided with a second user profile containing more detailed CPI. In a first embodiment, the node provides the second user profile within each request to the origin server. In an alternative embodiment, a single second user profile is forwarded to a WAP gateway interconnecting the node and the origin server, and this information is cached within the WAP gateway to replace the minimal user profile previously cached in this location.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
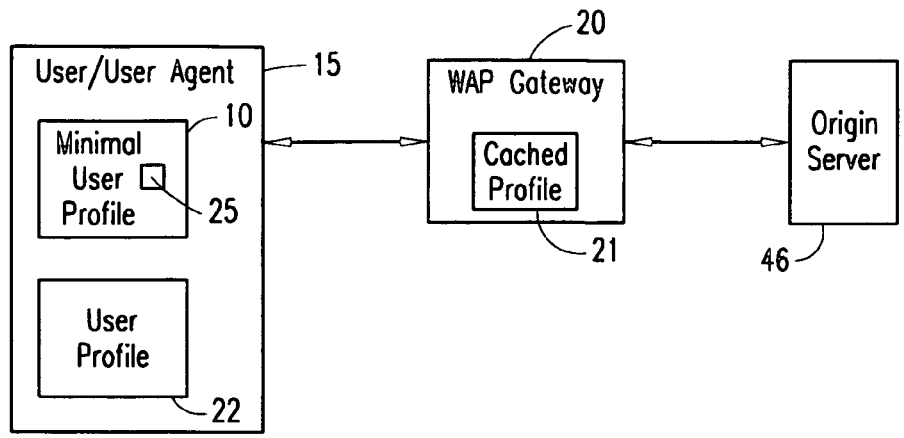
FIG. 1 illustrates the use of a minimal user profile and protocol communications between a user/user agent, a WAP gateway and an origin server.

Referring now to the drawings, and more particularly to FIG. 1, in order to use CC/PP protocol with the P3P standard, a user defines a minimal user profile 10 for transmission between a user/user agent 15 and a WAP gateway 20 which includes only minimal CPI 25. The minimal user profile 10 should include only such CPI 25 (such as screen size, voice, graphic capabilities, etc.) that the user is ready to reveal to web sites (origin server 46) with which the user has not yet come to a P3P agreement. In extreme cases, the user may not wish to provide any information to a possible non-trustworthy web site and the user may define a minimal user profile 10 that is empty. A second user profile 22 contains complete CPI information. The minimal user profile 10 has several uses including communication within a "safe-zone" before a P3P agreement, accessing non-P3P enabled web sites or web sites that do not meet the user's P3P privacy preferences, and serving third party requests to the WAP gateway 20 for cached profiles 21 (i.e., generating content that will be subsequently be pushed to a client device).

Figure 2:
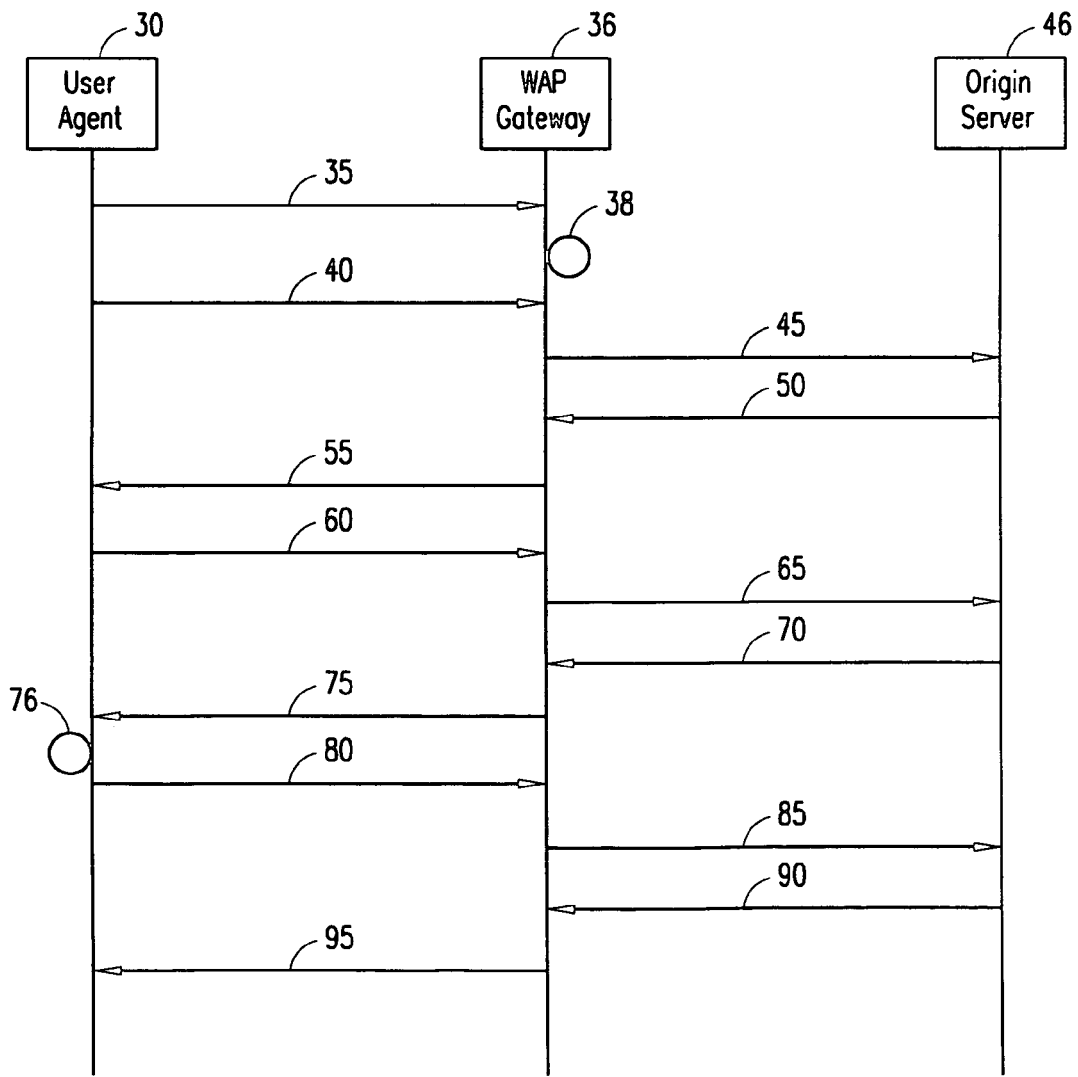
FIG. 2 is a flow diagram illustrating one embodiment for communicating a minimal user profile between a user agent and an origin server.

Referring now to FIG. 2, there is described a process for communication using a defined minimal user profile and the P3P protocol in order to agree about data collection and the release of further CPI. Upon opening a WSP session, a client, through its user agent 30 conveys a minimal user profile including Profile and Profile-Diff headers within a WSP connection request 35 to the WAP gateway 36. The WAP gateway 36 caches the minimal user profile at 38 for the lifetime of the WSP session. When the user desires to request content from a P3P enabled web site, the user agent 30 first requests the web sites P3P policy reference file by issuing a standard WSP request 40 to the WAP gateway 36. The WAP gateway 36 forwards the request at 45 via HTTP and includes the minimal CPI within the minimal user profile associated with the session to an origin server 46. The origin server 46 forwards the policy reference file back to the WAP gateway at 50 and the WAP gateway forwards the policy reference file on to the user agent 30 at 55.

After receipt of the policy reference file at the user agent 30, the user agent 30 requests the privacy policy from the origin server 46 using the minimal CPI stored within the minimal user profile of the WAP gateway 36. The request 60 passes from the user agent 30 to the WAP gateway 36 and on to the origin server 46 at 65. The privacy policy is forwarded back from the origin server 46 to the WAP gateway 36 to the user agent at 70 and 75, respectively. The communications requesting the policy reference file and the privacy policy are referred to as the Safe Zone since only minimal profile information is forwarded by the WAP gateway 36 to the origin server 46. Thus, only minimal privacy information is provided to the origin server about a user.

The user agent 30 compares at 76 the web sites privacy policy with the preferences of the user to determine whether further CPI should be transmitted to the web site. Users have the option to choose the level of protection by defining privacy preferences for the whole CPI or different preferences for various CPI components and/or attributes. If the user or user agent 30 accepts the origin servers privacy policy, the CPI may be transmitted to the origin server 46 by a first embodiment wherein the user agent 30 includes complete client profile information including profile-diff headers within each subsequent WSP request 80 in the WSP session. The WAP gateway 36 overrides the cached minimal profile with the provided complete profile information for each request and forwards this to the origin server 46 within an HTTP request 85. The response from the origin server 46 is forwarded back to the WAP gateway 36 at 90 and from the WAP gateway 36 to the user agent 30 at 95. While the present description has been made with respect to the use of only two profiles, it should be understood that three or more profiles may be similarly implemented.

If a user agrees that certain CPI attributes may be augmented by the WAP gateway 36, the WSP request or resume messages should include a flag/attribute set that authorizes the WAP gateway 36 to add information to the CPI. By sending the complete profile information with each subsequent request, the complete CPI profile of the user will not be cached within the WAP gateway. However, in contrast to the embodiment illustrated in FIG. 3, the additional CPI data must be transferred before each request. The embodiment of FIG. 3 may only be used if one privacy policy is valid for an entire web site.

Figure 3:
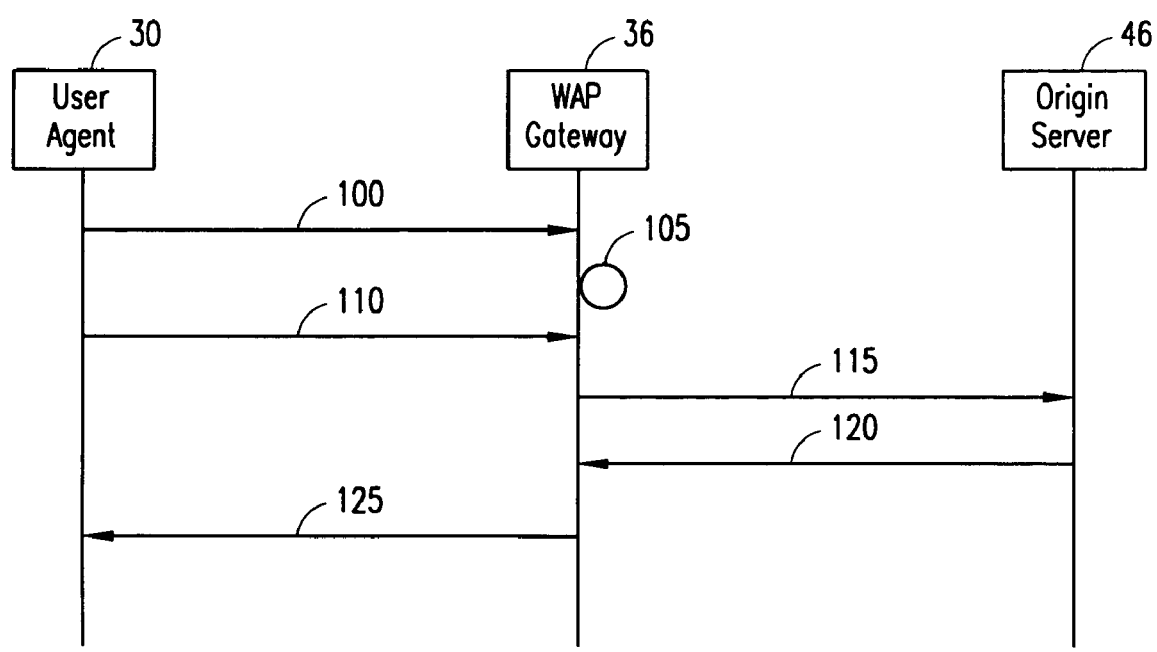
FIG. 3 is a flow diagram illustrating an alternative embodiment for using a minimal user profile between a user agent and an origin server.

Referring now to FIG. 3, there is illustrated an alternative embodiment for transmitting the CPI to the origin server after the user agent has compared the privacy policy with the user preferences at 76. In this embodiment, the user agent 30 transmits a WSP session resume message 100 to the WAP gateway 36 containing a complete user profile containing profile and/or profile-diff headers with the new CPI containing all approved information. The WAP gateway 36 updates the cached CPI with the complete profile information at 105. When a next request is made from the user agent 30 to the WAP gateway 36 at 110, the WAP gateway forwards a request to the origin server at 115 using the complete profile information now cached within the WAP gateway 36, and a response will be passed back to the WAP gateway 36 and the user agent 30 at 120 and 125, respectively.

The previous description is of a preferred embodiment for implementing the invention, and the scope of the invention should not necessarily be limited by this description. The scope of the present invention is instead defined by the following claims.

What is claimed is:

1. A method in a wireless communications system for connecting to a website on the Internet, the method comprising the steps of:
   a mobile user defining a first user profile for transmission between the mobile user and the website, the website comprising an origin server, the user, said first user profile containing user designated Capabilities and Preferences Information (CPI), wherein said user designated CPI includes only CPI the user consents to disclose to possibly untrustworthy websites;
   the user establishing a connection with the origin server using the first user profile;
   determining if a privacy policy of the origin server meets privacy preferences of the user; and
   providing a second user profile, containing more CPI, to the origin server if the privacy policy of the origin server meets the privacy preferences of the user.

2. The method of claim 1, wherein the step of establishing further comprises the steps of:
   establishing a WSP session with a WAP gateway using the first user profile; and
   caching the first user profile within the WAP gateway.

3. The method of claim 1, wherein the step of determining further comprises the steps of:
   requesting a policy reference file and a privacy policy from the origin server;
   receiving the policy reference file and the privacy policy from the origin server; and
   comparing the privacy policy of the origin server with the privacy preferences of the user.

4. The method of claim 1, wherein the step of providing further comprises the step of providing the second user profile in each request to the origin server.

5. The method of claim 1, wherein the step of providing further comprises the steps of:
   providing the second user profile to a WAP gateway;
   caching the second user profile at the WAP gateway; and
   attaching the second user profile to all requests received from the user and forwarded to the origin server.

6. A method in a wireless communications system for connecting to a website on the Internet, the method comprising the steps of:
   a mobile user defining a first user profile for the user, said first user profile containing user designated CPI;
   establishing a WSP session with a WAP gateway using the first user profile;
   caching the first user profile within the WAP gateway;
   the mobile user establishing a connection with the origin server using the first user profile;
   determining if a privacy policy of the origin server meets privacy preferences of the user using the first user profile; and
   providing a second user profile containing more CPI in each subsequent request to the origin server if the privacy policy of the origin server meets the privacy preferences of the user.

7. The method of claim 6, wherein the step of determining further comprises the steps of:

requesting a policy reference file and a privacy policy from the origin server using the first user profile;

receiving the policy reference file and the privacy policy from the origin server; and comparing the privacy policy of the origin server with the privacy preferences of the user.

8. A method in a wireless communications system for connecting to a website on the Internet, comprising the steps of:

a mobile user defining a first user profile for the user, said first user profile containing user designated CPI, including only the CPI the user consents to reveal to possibly untrustworthy websites;

establishing a WSP session with a WAP gateway using the first user profile;

caching the first user profile within the WAP gateway:

establishing a connection with an origin server connected to the website using the first user profile;

requesting a policy reference file and a privacy policy from the origin server using the first user profile;

receiving the policy reference file and the privacy policy from the origin server;

comparing the privacy policy of the origin server with the privacy preferences of the user to determine if a privacy policy of the origin server meets privacy preferences of the user;

providing a second user profile to a WAP gateway if the privacy policy of the origin server meets the privacy preferences of the user, wherein the second user profile contains more CPI than the first user profile:

caching the second user profile at the WAP gateway; and attaching the second user profile to all requests received from the user and forwarded to the origin server.

9. A wireless communications node associated with a mobile user, the node comprising:

a first user profile defined by the mobile user containing only user designated CPI the mobile user consents to reveal to possibly untrustworthy websites;

the mobile user defining a second user profile containing more CPI;

control logic for use by the wireless communications node for providing the first user profile to establish an initial connection to an origin server and for providing the second user profile to the origin server if the privacy policy of the origin server meets the privacy preferences of the user.

10. The wireless communications node of claim 9, wherein the control logic requests the privacy policy of the origin server.

11. The wireless communications node of claim 10, wherein the control logic compares the privacy policy of the origin server with the privacy preferences of the user.

12. The wireless communications node of claim 9, wherein the control logic attaches the second user profile to each request toward the origin server if the privacy policy of the origin server meets the privacy preferences of the user.

13. The wireless communications node of claim 9, wherein the control logic forwards the second user profile for caching at a WAP gateway if the privacy policy of the origin server meets the privacy preferences of the user.

14. A wireless communication node in communication with a mobile user, the wireless communication node comprising:

means for storing a first user profile, defined by the user and containing only user designated CPI that the user consents to reveal to possibly untrustworthy websites;

means for storing a second user profile, defined by the user and containing more CPI;

means for providing the first user profile to establish an initial connection to a website on the Internet, the website comprising an origin server, and for providing the second user profile the origin server if the privacy policy of the origin server meets the privacy preferences of the user.

15. The wireless communication node of claim 14, further comprises a means for providing control logic for requesting the privacy policy of the origin server.

16. The wireless communications node of claim 15, wherein the means for providing further compares the privacy policy of the origin server with the privacy preferences of the user.

17. The wireless communications node of claim 14, wherein the means for providing attaches the second user profile to each request toward the origin server if the privacy policy of the origin server meets the privacy preferences of the user.

18. The wireless communications node of claim 14, wherein the means for providing forwards the second user profile for caching at a WAP gateway if the privacy policy of the origin server meets the privacy preferences of the user.

* * * * *

UNITED STATES PATENT AND TRADEMARK OFFICE
CERTIFICATE OF CORRECTION

| | | |
|---|---|---|
| PATENT NO. | : 7,120,695 B2 | Page 1 of 1 |
| APPLICATION NO. | : 09/938085 | |
| DATED | : October 10, 2006 | |
| INVENTOR(S) | : Nilsson et al. | |

It is certified that error appears in the above-identified patent and that said Letters Patent is hereby corrected as shown below:

In Column 4, Line 14, in Claim 1, after "server," delete "the user".

In Column 5, Line 16, in Claim 8, delete ":" and insert -- ; --, therefor.

In Column 5, Line 30, in Claim 8, delete ":" and insert -- ; --, therefor.

In Column 6, Line 29, in Claim 15, delete "communication" and insert -- communications --, therefor.

Signed and Sealed this

Eighteenth Day of December, 2007

JON W. DUDAS
*Director of the United States Patent and Trademark Office*